J. M. HALL.
Cotton and Corn Planter.

No. 210,604. Patented Dec. 10, 1878.

WITNESSES
Nat. E. Oliphant
T. D. A. Durand

INVENTOR
James M. Hall,
per Chas. H. Fowler,
Attorney

UNITED STATES PATENT OFFICE.

JAMES M. HALL, OF LARISSA, TEXAS.

IMPROVEMENT IN COTTON AND CORN PLANTERS.

Specification forming part of Letters Patent No. 210,604, dated December 10, 1878; application filed November 2, 1878.

*To all whom it may concern:*

Be it known that I, JAMES M. HALL, of Larissa, in the county of Cherokee and State of Texas, have invented a new and valuable Improvement in Cotton and Corn Planters; and I do hereby declare that the following is a full, clear, and exact description of the construction and operation of the same, reference being had to the annexed drawings, making a part of this specification, and to the letters and figures of reference marked thereon.

Figure 1:
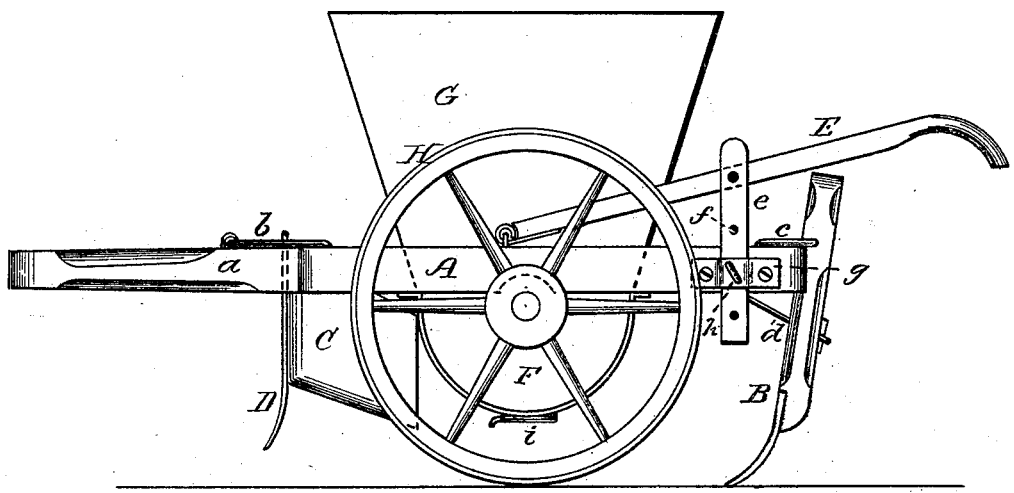
Figure 2:
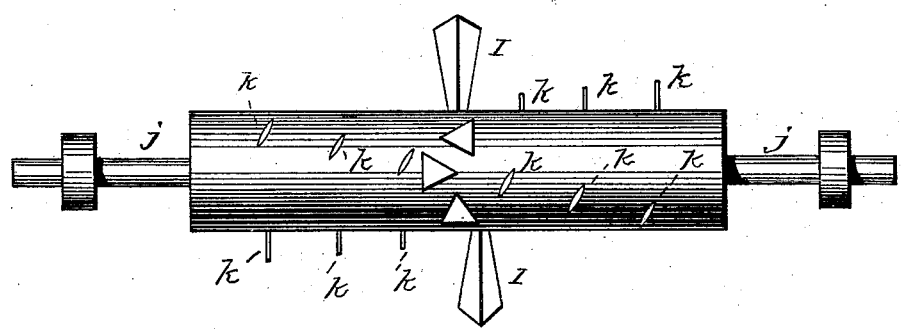

Figure 1 of the drawing is a representation of a side elevation of my invention. Fig. 2 is a detail view, on an enlarged scale, of the rotary axle with the agitators and spiral lines of cogs or pegs connected to or upon its periphery.

This invention has relation to corn and cotton planters; and the object thereof is to provide means whereby the seed is brought from the extremities of the axis in the drill-box or hopper to the center or middle over the drill-hole, and at that point stirred or agitated, to insure the perfect feeding of the seed through the drill-hole, also to prevent the seed from banking on the sides of the drill-box or hopper, as will be hereinafter described, and subsequently pointed out in the claims.

In the accompanying drawings, A represents the frame of the planter, constructed of wood or other suitable material, and having secured thereto a tongue, $a$, by brace-rods $b$. Secured to the rear of the frame A, by curved rods $c$ and brace-rods $d$, are covering plows or shovels B, and under the front of the frame A are secured the furrow-former C and opener D. To the frame A are hinged handles E, having pivoted thereto standards $e$, formed with a series of holes, $f$, the lower ends of said standards passing down through brackets $g$, and held at any desired height by pins $h$, passing through openings in the brackets and standards.

This construction enables the handles E to be raised or lowered or adjusted to the desired height to accommodate the person operating the planter.

To the under side of the frame A is secured the chute F, provided with an opening to allow the seed to pass through, and is closed when not in use by a slide or cover, $i$. The hopper G is secured to the frame A in any manner that will admit of its being removed when desired. The axle $j$, which passes through the sides of the chute F, has rigidly secured to its outer ends suitable wheels H, so that by the revolution of the wheels the axle will also revolve. That portion of the axle within the chute F is considerably larger in circumference than that portion to which the wheels are attached, and has secured upon its periphery spiral lines of cogs or pegs $k$, which extend from the extremities of the large portion of the axle (at each end) backward to the middle thereof, whereby the seed is brought from the sides of the chute to the center, where the seed is agitated and thoroughly stirred by agitators I, secured to the periphery of the axle on a line over the opening in the bottom of the chute. These agitators I are so connected to the periphery of the axle that they turn upon their own axis during the rotation of the axle $j$, and are triangular in form, presenting three faces, against which the seed comes in contact, so that it will insure their rotation.

It will be seen that as the cogs or pegs $k$ bring the seed from the side of the chute toward the center the agitators are turning upon their axis and thoroughly stirring and mixing the seed, and preventing any possibility of the seed caking over the opening in the chute, and insuring the seed at all times being properly distributed with regularity.

I do not desire to confine myself to the precise construction of the covering plows or shovels, as boards or blocks may be substituted, and many changes and modifications may be made in the furrow former and opener without departing from the principle of my invention.

A seeder constructed according to my invention is not only simple in its parts, but practical in its operation, and there is no possibility of the seed becoming clogged or caked around the sides of the chute or hopper.

Having now fully described my invention, what I claim as new, and desire to secure by Letters Patent, is—

1. In a cotton or corn planter, the combination, with the axle $j$, of the agitators I, secured thereto and arranged to rotate or turn upon their own axis during the rotation of the axle, as set forth.

2. The axle $j$, provided with spiral lines of cogs or pegs $k$, in combination with the rotary agitators I, substantially as and for the purpose specified.

In testimony that I claim the above I have hereunto subscribed my name in the presence of two witnesses.

JAMES MADISON HALL.

Witnesses:
　J. C. WOOD,
　WM. F. THOMPSON.